United States Patent Office 3,784,714
Patented Jan. 8, 1974

3,784,714
PROTECTIVE COATINGS FOR CONFECTIONERIES AND BAKERY PRODUCTS
James L. McReynolds and Harry H. Topalian, Dover, Del., assignors to General Foods Corporation, White Plains, N.Y.
No Drawing. Filed Jan. 11, 1971, Ser. No. 105,697
Int. Cl. A23g 3/00
U.S. Cl. 426—171                    4 Claims

ABSTRACT OF THE DISCLOSURE

Improved moisture and oxygen protection is obtained in a chocolate or imitation chocolate coating by the addition of a minor amount of calcium stearate to the composition. This type of coating prevents the moisture loss from coated candy centers or bakery products with high moisture and vapor pressure. The candy center, cookie filling or bakery product consequently remains soft in texture and of stable flavor quality over extended periods of time.

BACKGROUND OF THE INVENTION

This invention relates to solid chocolate materials and chocolate coated products. More particularly, it relates to chocolate coatings and chocolate flavored coatings suitable in the preparation of bars, candies, bakery products, icings, and the like.

The moisture loss of certain confectionery products during storage is a matter of common experience. Chocolate coated candies, cookies, cakes, doughnuts and other bakery products with high moisture centers and fillings tend to change in appearance under certain conditions of storage. While the phenomenon of "bloom" is observed with many such confectionery and bakery products, the related phenomenon of loss of moisture from the centers of the products is perhaps more serious. Thus, high moisture candy centers such as cream fondant, marshmallow, and coconut covered with chocolate or imitation chocolate coatings may rapidly lose moisture on storage. The candy center becomes hard and the coating cracks and collapses. Similarly, chocolate coated bakery products such as cakes, doughnuts and specialty items may quickly become stale due to the transmission of moisture through the coating resulting in a relatively short shelf life. Consequently, chocolate coated candies and bakery products with high moisture centers and fillings supplied to retailers in a fresh condition frequently take on an unpalatable appearance or quickly become stale due to moisture loss.

The taste and technical requirements of the chocolate industry preclude any substantial modifications of the chocolate compositions as currently employed. For instance, in the enrobing or dipping of confectionery and bakery items the process is very sensitive to the melting point and viscosity properties of the coating. Furthermore, foreign tastes must be avoided and the characteristic chocolate flavor must be preserved to the satisfaction of the consumer. Moreover, federal standards of identity limit the permissible ingredients for chocolate and chocolate coatings as well as for other food products.

The term "chocolate product" as employed in this application is intended to include the solid or semiplastic food prepared by finely grinding cacao nibs and compositions wherein this material is an essential ingredient. Thus, within the expression is included such material commonly known as "chocolate liquor," "chocolate," "chocolate coating," "bitter chocolate coating," "bittersweet chocolates," "bittersweet chocolate coating," "semi-sweet chocolate" or "semi-sweet chocolate coating" wherein the sweetening ingredient may be sucrose, dextrose, dried corn syrup and the like; and the chocolate liquor, milk solids, sweetened compositions commonly known as "milk chocolate," "sweet milk chocolate," "milk chocolate coating," "sweet milk chocolate coating," "skim milk chocolate," "buttermilk chocolate" and "mixed dairy product chocolates." Furthermore, compositions made from sweet chocolate or cocoa and fats other than cacao fat are intended by the generic term. In these latter compositions the cacao fat is replaced entirely or in part by one or a mixture of two or more vegetable food oils or fats other than cacao fat, which may be hardened or hydrogenated. Such coatings are employed primarily to obtain variations in melting point and simulate melting properties of chocolate.

The chocolate and chocolate flavored compositions as described above may contain additives as spice, ground vanilla beans, any natural food flavoring oil, oleoresin or extract, vanillin, ethyl vanillin, or other artificial food flavoring, butter, milk fat, dried malted cereal extract, ground coffee, ground or whole nut meats, salt, and viscosity modifiers such as lecithin.

While packaging films are available which afford various degrees of moisture retention, severe limitations are noted where small candies and bakery products are concerned. Edible films are also marketed for the protection of meat products and nut meats against loss of water vapor. However, the probability of off flavors being introduced by the use of such edible films is a disadvantage which makes edible films as a class not entirely suitable for application to candies and bakery products. At the present time, it appears that chocolate or vegetable fat confectioners coatings with improved moisture barrier properties have not been available for use with high moisture candy centers and bakery products.

It is an object of the present invention to produce a chocolate coating having improved moisture barrier properties.

It is another object of the present invention to provide a process of treating chocolate for use in the preparation of confectionery coatings for products such as candy centers, cookies, biscuits, doughnuts, cakes and the like wherein moisture loss from the centers of such confectionery items is reduced.

A further object of the present invention is to provide an edible chocolate coating serving to stabilize the coated products against moisture loss and which coating does not vary essentially in composition or physical properties from conventional chocolate and confectionery coatings presently in commercial usage.

SUMMARY OF THE INVENTION

In accordance with the present invention it has been discovered that by the incorporation of minor amounts of calcium stearate within a chocolate product the tendency of moisture loss from edible confectionery or bakery products coated with such chocolate product is greatly reduced. Thus, it has unexpectedly been found that decreases in moisture transmission of about 25% or higher as compared with regular chocolate have been obtained. The preferred level of calcium stearate ranges from 0.1 to 5.0% by weight of the chocolate coating.

While the physical and chemical theory underlying the surprising improvement is not entirely understood, it is postulated that the improvement occurs because of one or a combination of the actions listed below.

Chocolate and imitation chocolate coatings with improved moisture and oxygen protective properties can be manufactured for application in the confectionery and biscuit industries. By the use of a low percentage of calcium stearate in the coating composition, the moisture transmission through the chocolate film is minimized.

The mechanism postulated for this improvement could be explained by each of the following theories:

(1) The proportion of liquid to solid in a fat film will directly influence the moisture permeability. An additive which acts as a dispersing or wetting agent, or absorbs the liquid oil due to the relatively large surface area of the additive particles will decrease moisture transmission.

(2) Another possible explanation for the passing of the moisture through the fat film is by means of the polar compounds in the composition. The water transmission through the membrane is forwarded by the presence of polar compounds in the chocolate composition—such as the hydrophilic fraction of lecithin, fatty acids and monoglycerides. Thus, any additive which reduces or ties up the polar sites either by hydrogen bonding or by blocking of the interfaces, will decrease the vapor transmission.

(3) Additives in the chocolate film which absorb the water vapor will influence the transmission rate through the film. The stability and vapor pressure of the material with the adsorbed water will determine the barrier efficiency.

DETAILED DESCRIPTION OF THE INVENTION

In the preparation of the chocolate coatings of this invention a solid chocolate of conventional commercial origin is melted and the calcium stearate is added to the liquid in a molten state in the desired proportions with constant stirring. The mass is then tempered following the usual procedure. Such chocolate is available for the dipping of centers, or may be cast into molds for the production of chocolate products which are then supplied to candy, cookie and biscuit manufacturers.

Typical examples illustrating the present invention follow. However, it must be observed that these examples are illustrative only.

EXAMPLE I

Milk chocolate coating with additive

A mix of the following composition is blended in the melanger for 15 minutes:

| | |
|---|---|
| Chocolate liquor | 3 lb. |
| Roller whole milk | 4 lb. 4 oz. |
| Mil-lait [1] | 0 lb. 4 oz. |
| Ganulated sugar | 12 lb. 15 oz. |
| Calcium stearate | 0 lb. 8 oz. |
| Cocoa butter | 2 lb. 0 oz. |
| | 21 lb. 31 oz. |

[1] Enzymatically treated whole milk powder.

Flavors are also added at the beginning of the mixing cycle:

1.00 oz. salt
1.00 oz. vanillin

The melangered mix is then milled using the regular 5-roll refiners to give a fineness of .0011 inch. The refined dry mix is then added to Dopp pot with 2 oz. lecithin and 1 lb. 15 oz. cocoa butter for final mixing. Processing temperature was 140° F. and mixing time 2 hours. Final viscosity was standardized to 145° McMichael by the addition of 2 lb. 6 oz. cocoa butter. Final formula is as follows:

| | Percent |
|---|---|
| Chocolate liquor | 11.0 |
| Roller whole milk | 15.5 |
| Mil-lait | 0.9 |
| Granulated sugar | 46.9 |
| Calcium stearate | 1.8 |
| Cocoa butter | 23.4 |
| Lecithin | 0.5 |
| | 100.0 |

EXAMPLE 2

Milk chocolate coating without additive

A second batch of milk chocolate was formulated as in Example I, but without the calcium stearate additive. Final formula is as follows:

| | Percent |
|---|---|
| Chocolate liquor | 11.9 |
| Roller whole milk | 16.9 |
| Mil-lait | 1.0 |
| Granlated sugar | 53.6 |
| Cocoa butter | 16.1 |
| Lecithin | 0.5 |
| | 100.0 |

The formulations of Examples 1 and 2 were prepared for the hand dipping of cream fondant and coconut centers, doughtnuts, and sponge cake as follows. Four pounds of the chocolate was melted at 120° F. in an aluminum pan. Melted material was stirred continuously by hand in a 70° F. room down to 79° F. (about 20 minutes) and then brought back up to 88° F. with stirring in a 95° F. room (about 15 minutes).

Pre-weighed cream fondant and coconut centers, doughnuts and sponge cake were each hand dipped in the tempered formulations of Examples 1 and 2. The hand dipped items were then placed on a cellophane covered tray and let stand overnight at 65° F., 50% relative humidity.

The moisture barrier properties of the coating containing calcium stearate (Example 1) and the control (Example 2) were evaluated according to the following procedure. Weighed samples of the coconut and cream fondant centers, doughnuts and sponge cake were placed in Petri dishes and sealed in a screw cap jar containing a suitable desiccant such as calcium chloride or calcium sulphate. These sealed jars were then stored at 75° F. Each sample was weighed on a weekly basis and the weight loss recorded. Having recorded the weight of each item before and after coating, and the percent moisture of each center immediately prior to the coating operation, the moisture transmitted from each center through the chocolate shell was calculated as the percent of the total available moisture lost from the center. Results after 16 weeks of storage time are recorded in Table 1.

TABLE 1.—PERCENT OF AVAILABLE MOISTURE TRANSMITTED

| | Center | | | | | | | |
|---|---|---|---|---|---|---|---|---|
| | Fondant | | Coconut | | Doughnut | | Sponge cake | |
| Coating | Ex. 1 | Ex. 2 | Ex. 1 | Ex. 2 | Ex. 1 | Ex. 2 | Ex. 1 | E x. |
| Storage time in weeks: | | | | | | | | |
| 1 | 2.4 | 3.0 | 0.7 | 0.9 | 9.5 | 13.0 | 12.7 | 17.1 |
| 2 | 4.7 | 6.0 | 1.4 | 1.8 | 20.4 | 27.5 | 26.6 | 34.0 |
| 3 | 6.1 | 7.5 | 2.5 | 2.9 | 31.6 | 42.0 | 37.8 | 50.5 |
| 4 | 7.4 | 9.0 | 3.1 | 3.9 | 37.4 | 51.0 | 50.9 | 66.0 |
| 8 | 12.4 | 15.0 | 6.2 | 7.6 | | | | |
| 12 | 17.4 | 21.0 | 9.2 | 11.1 | | | | |
| 16 | 22.2 | 27.1 | 11.9 | 14.4 | | | | |

As can be seen from the data of Table 1, the coating of Example 1 containing calcium stearate transmitted on the average up to 25% less moisture than the control coating of Example 2. The confectionery and bakery products coated with the control coating began to show a change in texture due to moisture loss days or weeks before similar changes were detected in those products coated with the coating containing calcium stearate. These results show that the shelf life of confectionery and bakery products having a chocolate coating containing calcium stearate is significantly extended as compared with such items having a regular chocolate coating.

While this invention has been particularly described with reference to chocolate or chocolate flavored coatings, it is equally applicable to other confectionery coatings based on cocoa butter and/or vegetable fat, sugar, flavorings, milk and the like.

What we claim is:

1. In a process of coating a confection or bakery product with a chocolate product coating, the improvement which consists essentially of incorporating in said coating calcium stearate in an amount effective to retard moisture loss from said confection or said bakery product.

2. In a process of coating a confection or bakery product with a chocolate product coating, the improvement which consists essentially of incorporating in said coating calcium stearate in an amount of from about 0.1 to 5.0% by weight of said coating, said calcium stearate being effective to retard moisture loss from said confection or said bakery product.

3. A composition adapted for use as a coating for confections and bakery products consisting essentially of a chocolate product and calcium stearate, said calcium stearate present in an amount effective to retard moisture loss from confections and bakery products coated with said composition.

4. A composition adapted for use as a coating for confections and bakery products consisting essentially of a chocolate product and calcium stearate, said calcium stearate present in an amount of from about 0.25% to 2.5% by weight of said product, said calcium stearate being effective to retard moisture loss from confections and bakery products coated with said composition.

References Cited

UNITED STATES PATENTS

| | | | |
|---|---|---|---|
| 1,925,376 | 9/1933 | Farrell | 99—23 X |
| 3,433,649 | 3/1969 | Cooke et al. | 99—23 X |
| 3,199,984 | 8/1965 | Jensen et al. | 99—23 |
| 2,991,226 | 7/1961 | Millar et al. | 99—134 X |
| 3,235,457 | 2/1966 | Laden | 99—134 X |
| 3,471,304 | 10/1969 | Hamdy et al. | 99—166 |
| 2,626,216 | 1/1953 | Cross | 99—23 |

FOREIGN PATENTS

| | | | |
|---|---|---|---|
| 692,365 | 6/1953 | Great Britain | 99—23 |

S. LEON BASHORE, Primary Examiner

F. FREI, Assistant Examiner

U.S. Cl. X.R.

426—306